(12) United States Patent
Itskov et al.

(10) Patent No.: US 7,375,953 B2
(45) Date of Patent: May 20, 2008

(54) COUNTERTOP VIDEO TERMINAL

(75) Inventors: Boris Itskov, Thornhill (CA); Igor Starovoitov, Newmarket (CA)

(73) Assignee: JVL Corporation, Concord, ON ( * ) Notice: Subject to any disclaimer, the term of this patent is extended or adjusted under 35 U.S.C. 154(b) by 266 days.

(21) Appl. No.: 11/072,445

(22) Filed: Mar. 7, 2005

(65) Prior Publication Data

US 2005/0195562 A1    Sep. 8, 2005

(51) Int. Cl.
    *H05K 7/00*    (2006.01)
(52) U.S. Cl. .................. 361/681; 361/682; 705/43
(58) Field of Classification Search ................ 361/681, 361/682; 705/43
See application file for complete search history.

(56) References Cited

U.S. PATENT DOCUMENTS

| | | | |
|---|---|---|---|
| 4,722,053 A * | 1/1988 | Dubno et al. ................. 463/42 |
| 6,007,426 A | 12/1999 | Kelly et al. |
| 6,085,972 A * | 7/2000 | Wright ........................ 235/375 |
| 6,560,093 B1 * | 5/2003 | McLeod et al. ............. 361/681 |
| 2002/0082993 A1 * | 6/2002 | Hoyos et al. ................. 705/43 |
| 2003/0163388 A1 * | 8/2003 | Beane ........................ 705/26 |
| 2003/0177501 A1 * | 9/2003 | Takahashi et al. .......... 725/110 |
| 2005/0024343 A1 | 2/2005 | Collins |

* cited by examiner

*Primary Examiner*—Jayprakash Gandhi
*Assistant Examiner*—Ingrid Wright (57) ABSTRACT

A countertop video terminal uses a cooperating structural framework which receives and protects the computer control module, the touchscreen module and the financial transaction module. The touchscreen module is cantilevered from an upright tower support provided at one side of the base. The computer control module is provided on said base and is of a reduced height to define a thin rearwardly extending module. A clear gap or recess is provided between the touchscreen module and the computer control module. The touchscreen preferably partially overlaps with the financial transaction module provided in the tower support.

9 Claims, 10 Drawing Sheets

COUNTERTOP VIDEO TERMINAL

FIELD OF THE INVENTION

The present invention relates to countertop video terminals and in particular relates to countertop video terminals having a series of cooperating frame modules for effective support of the individual components.

BACKGROUND OF THE INVENTION

Countertop video game terminals have been popular for many years and these terminals continue to change as technology improves. The capabilities of countertop video terminals expands as the cost of the computer chips and memory decreases. In the early 1990's a significant advance was made by adopting touchscreens as both an input device and an output display.

Countertop video terminals have traditionally been of a box-shape similar to small portable televisions. The terminals are generally rectangular but the corners have been smoothed or a gentle curved transition introduced to improve the box like appearance thereof.

Most countertop video terminals are coin operated and therefore to one side of the touchscreen a separate financial transaction module is provided. These modules are built into the housing, at one side of the touchscreen, and thus substantially increase the width of the terminal. The computer control module including the various circuit boards memory and other electrical components are provided behind the touchscreen. Some of these terminals include a large top opening access door to access the control module for resetting of the operator terminal or operator reprogramming of the terminal. In addition, the financial transaction module typically includes a coin slot for receiving quarters, dollar coins or other coin currency and preferably includes a banknote receiver. Typically, there is a separate access door to allow an operator to gain access to the funds which have been deposited to the terminal. Interior to the financial transaction module a removable container is provided that collects the coins and/or bills.

Many countertop video terminals do not include a credit card or smart card capabilities as this typically requires a communication capability for the terminal which is not always available or may not be justifiable. If desired terminals can be provided with this option.

The existing designs are functional and operate in a satisfactory manner. Video terminals can be subject substantial abuse and these terminals require a robust construction to reduce service requirements and provide in an appropriate product life.

Often these video terminals include more than 80 different games and these games typically operate for a relatively short period of time of two minutes to four minutes. Typically, the games include two or three rounds and perhaps a bonus round.

The present invention provides a countertop video terminal which includes effective space utilization and provides a modern appearance reflective of the significant technology and capabilities of the terminal. Thus the terminal assists in promoting the desirability of playing the games provided thereon. Effective protection of the various modules of the terminal is maintained while providing a terminal which is both pleasing and inviting to a patron. In a preferred embodiment of the invention some of the modules partially overlap in an effective way to decrease the width of the terminal and provide more effective space utilization to the rear of the terminal.

SUMMARY OF THE PRESENT INVENTION

Countertop video terminals according to the present invention comprises a payment receiving module, a computer control module, a touchscreen input/output module and a support structure for integrating the modules. The support structure comprises a base having a front edge a first side edge and an opposed second side edge and a rear edge. A tower support is provided to one side of the base with the computer control module on the base intermediate the tower and the second edge. The tower includes a hollow cavity therein that receives a cash type payment container. The tower support further includes a structural support extending towards to second side and beyond the tower support that receives and supports the touchscreen input/output module with the touchscreen input/output module partially overlapping with the tower support.

According to an aspect of the invention the computer control module is provided on the support module and is located below a bottom edge of the touchscreen input/output module.

In a further aspect of the invention the structural support is supported in a cantilevered manner from the tower support.

According to a different aspect of the invention the touchscreen input/output module is vertically spaced from the computer control module at said front edge a distance of at least 1 inch.

In yet a further aspect of the invention the touchscreen input/output module includes an audio output positioned above the computer control module and rearwardly of the front edge.

According to an aspect of the invention the audio output directs an output signal towards the computer control module.

In a further aspect of the invention the computer control module has a height of less than 50% of an average depth or length of the computer module.

In yet a further aspect of the invention the computer control module has a height of less than 5 inches and preferably less than 3 inches.

In a further aspect of the invention each module is an elongate with the computer control module being orientated horizontally and generally extending between said front and rear edges of the base and the payment receiving module extending vertically and rearwardly between the front edge and the rear edge at one side of the space and the touchscreen input/output module extending at a raised position adjacent the front edge and positioned between the side edges. The touchscreen includes to one side thereof a payment receiving cover which is only part of the end surface of the tower support.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION IN WHICH

Figure 1:
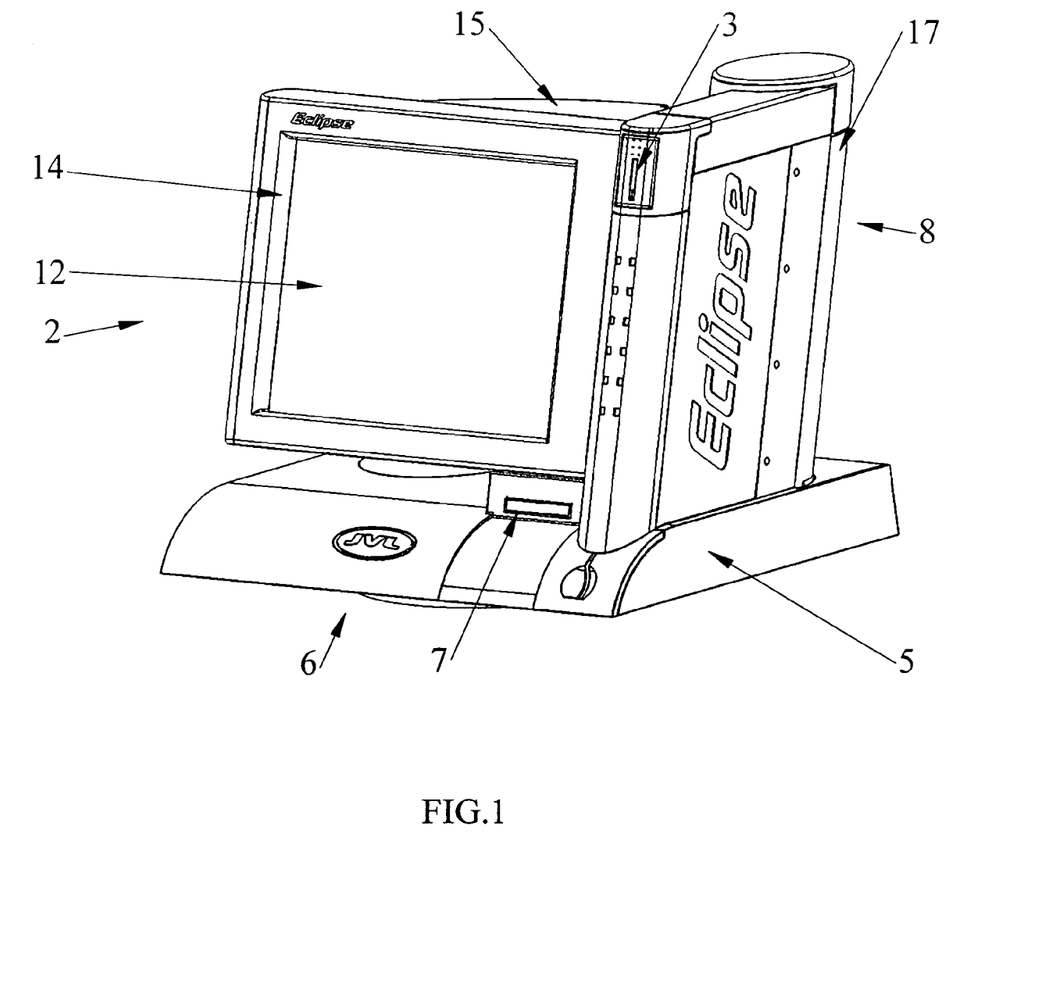
FIG. 1 is a front perspective view of the countertop video terminal.
Figure 2:
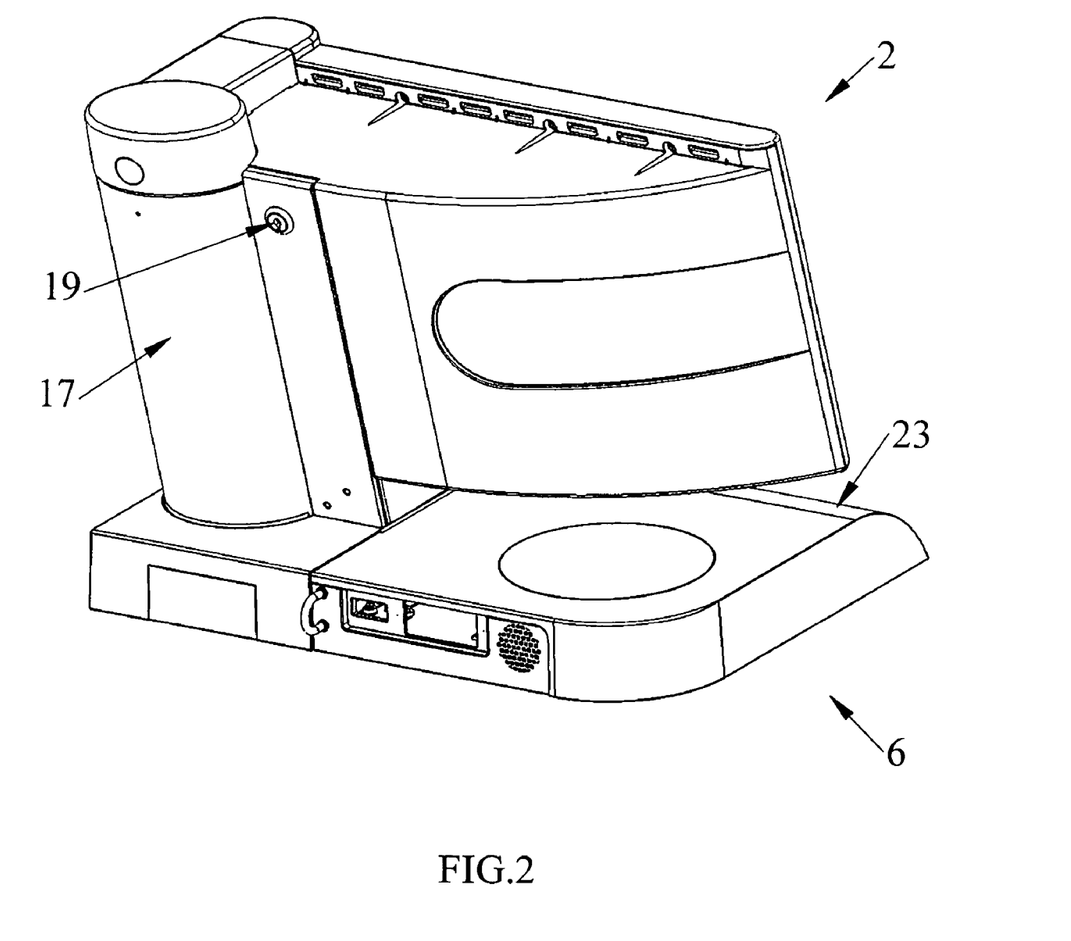
FIG. 2 is rear perspective view of the countertop video terminal.
Figure 3:
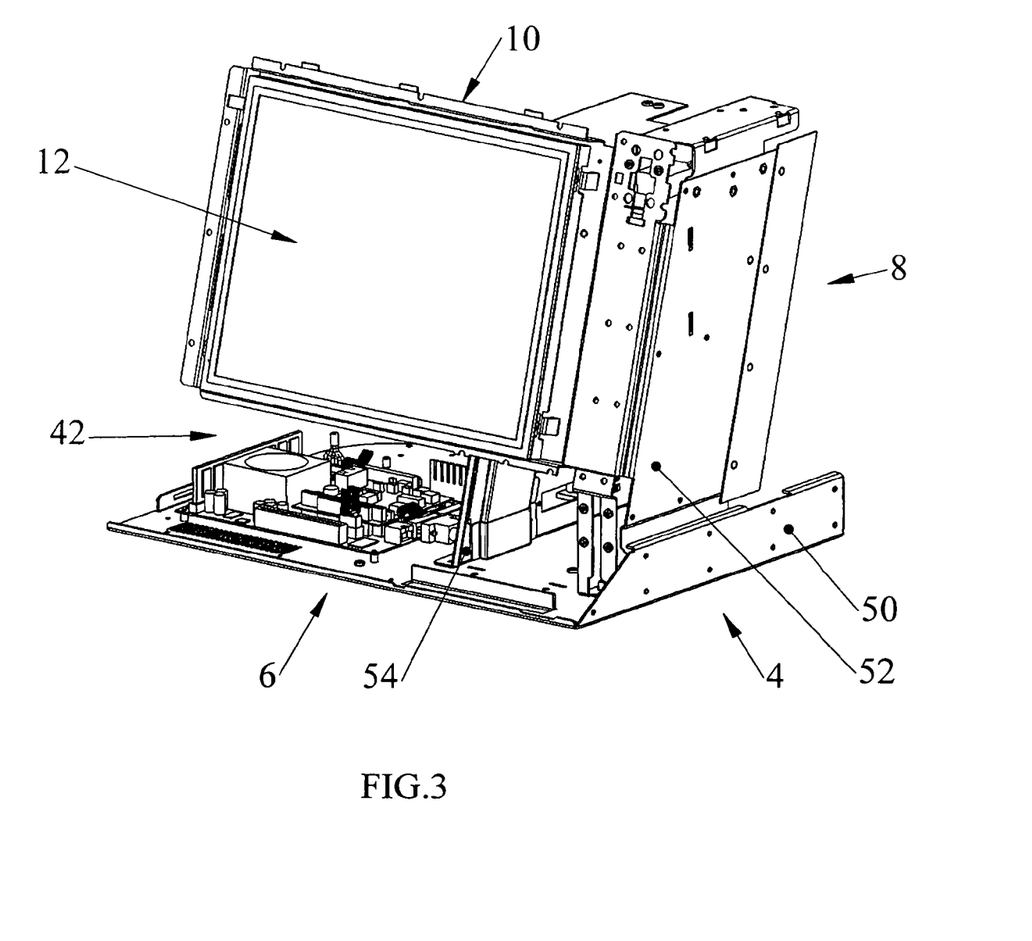
FIG. 3 is a partial perspective view showing components of the structural framework of the countertop video terminal.
Figure 4:
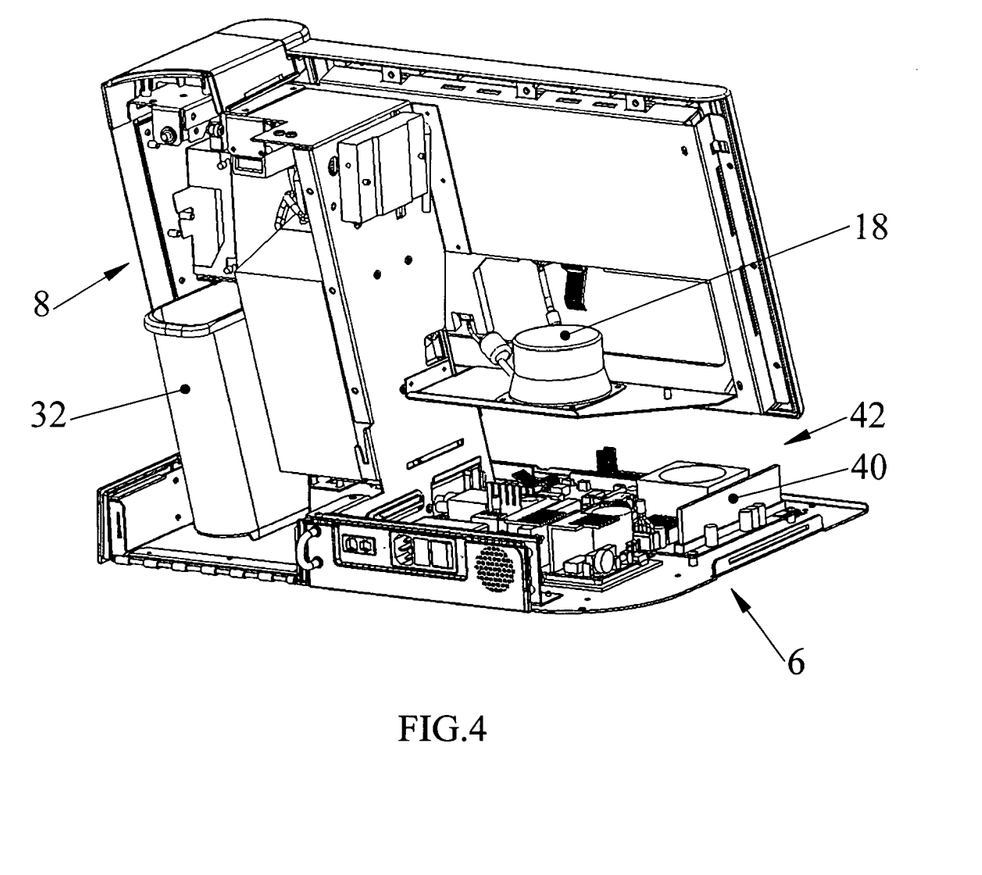
FIG. 4 is a rear perspective view of the countertop video terminal with a number of the cover portions removed to expose the structural framework and the individual modules.

The countertop video terminal 2, as shown in FIGS. 1 and 2 has a touchscreen 12 supported in a raised cantilevered manner from one side of the terminal and above the base 6. The touchscreen 12 includes a trim frame 13 provided about the touchscreen 12 which covers a structural frame support provided there behind as shown in FIGS. 3 and 4. The terminal 2 includes a coin slot 3 provided at a raised point to one edge of the terminal and a banknote slot 7 provided beneath the touchscreen terminal and above the base unit 6. Various alternate payment arrangements can be incorporated in the terminal if desired. A tower support 8 is provided to one side of the base 6 and this tower support supports the touchscreen 12 in a cantilevered manner to one side of the tower support. A rear curved tapered cover 15 is provided behind the touchscreen to enclose some electrical components including an audio speaker behind the touchscreen and above the base 6. The rear of the tower support 8 includes an access panel 17 which is removable by opening of the key lock 19 to access the payment module located interior to the tower support.

The perspective view of FIG. 2 shows a cover 23 for the computer control module which is located beneath the cover and above the base 6. The countertop video terminal 2 is shown in FIGS. 1 and 2 includes a generally thin base 6 which includes a horizontally disposed rearwardly extending computer control module with a tower support provided to one side of the base. The tower support includes interior thereto the payment module and the tower support also serves to support the touchscreen 12 in cantilevered manner to one side of the tower support and above the base unit 6. A substantial gap is provided beneath the touchscreen 12 intermediate the lower edge of touchscreen and the base unit 6. This space is advantageously used to provide audio output as can be appreciated from FIG. 4.

In FIG. 4 the speaker 18 is located behind the touchscreen 12 and produces an output signal towards the computer control module 40. The sound is effectively transmitted into the gap and to the front of the countertop video terminal. This position hides the speaker and reduces the probability of vandalism.

FIGS. 3 through 10 show details of the various components and the mounting of the modules on the structural framework 4. The structural framework 4 includes a base 6 and in this case a plate member with an upturned side edge 50. This side edge supports the tower support 8 to one side of the base 6 and the tower support 8 supports the touchscreen support 10 in a cantilevered manner to one side of the tower and partially overlapping with the tower.

FIG. 3 clearly illustrates the overlap of the touchscreen 12 with the tower 8 and significantly improves the structural integrity of the touchscreen support 10 as well as closing one side of the tower support 8, thereby increasing the structural integrity of the tower support. It has been found that this arrangement provides excellent support of the touchscreen 12 and allows for the clear gap 42 above the computer control module shown in other figures.

The rear perspective view of FIG. 4 shows the computer control module 40 located to one side of the tower support 8 and extending less than 5 inches above the base 6 and preferably less than 3 inches above the base 6. In this way, the computer control module is generally horizontally disposed and extends rearwardly. This computer control module preferably operates with flash memory for fast access to the various games and the computer control module does not include a CD drive or DVD drive. These drives, although less expensive than flash memory suffer from ineffective space utilization and have not proven as reliable.

Figure 5:
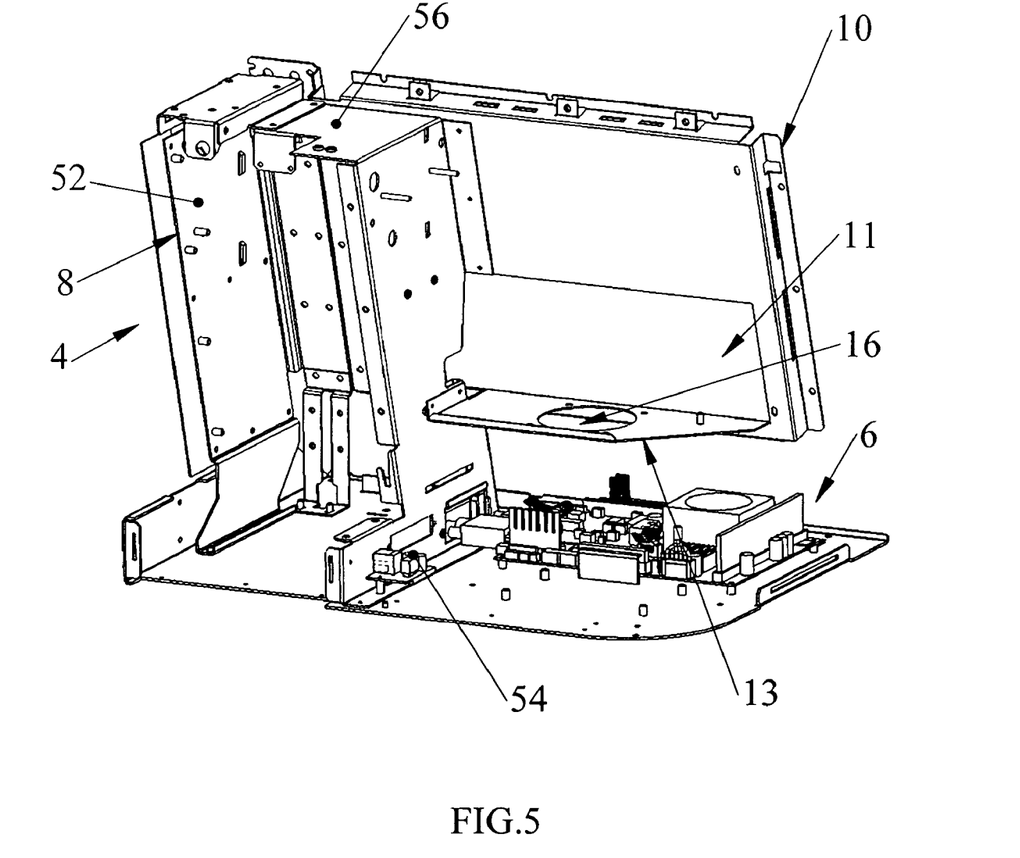
FIG. 5 is a rear perspective view of the framework of the countertop video terminal.
Figure 6:
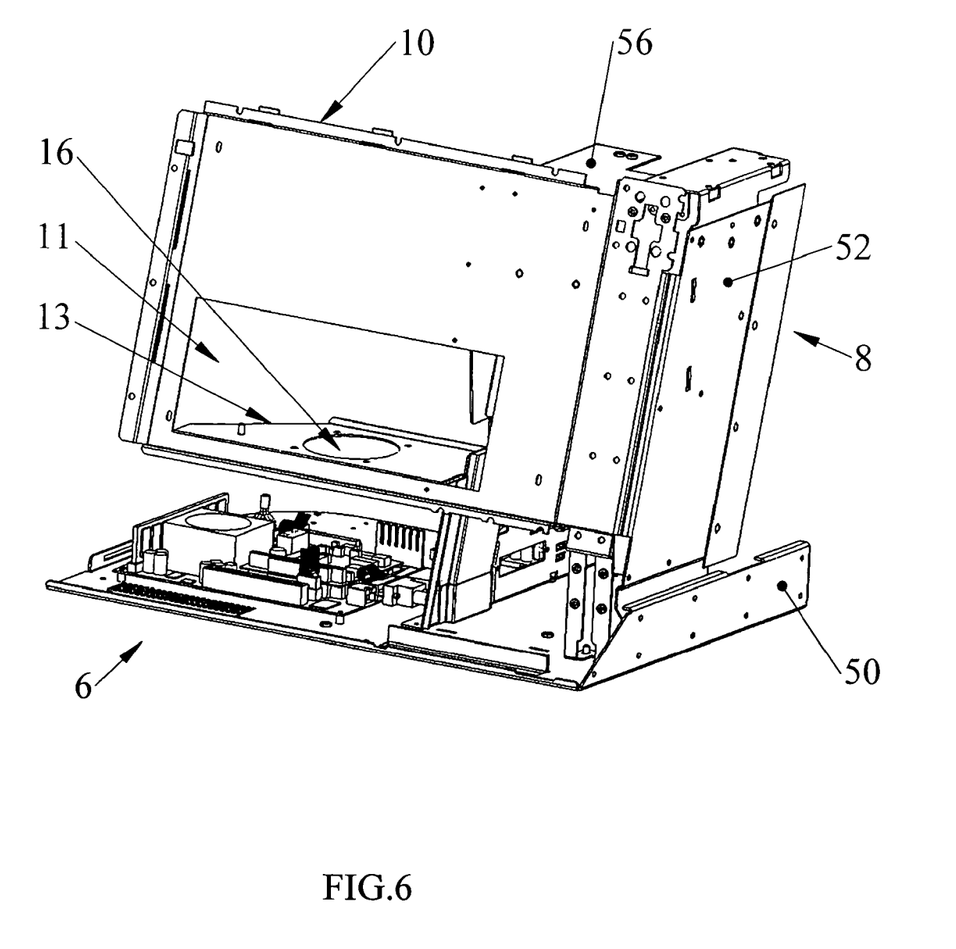
FIG. 6 is a front perspective view of the structural frame of the countertop video terminal.

Further details of the structural framework 4 are shown in FIG. 5. As clearly shown the tower support 8 is firmly fastened to the base 6 and the front face of the towers closed by the touchscreen support 10. A top tower connection plate 56 serves to cooperate with other flange members provided at the top of the tower to provide a plate support across the top of the tower. This plate support cooperates with the tower to provide stiff robust framework for supporting of the payment modules to the front of the tower as well as providing for a payment collection container 32 shown in FIG. 4 that is maintained within the tower.

FIG. 4 also shows a coin and bill receiving mechanism for depositing of the payments within the container 32. There are a number of different arrangements that can be provided. Preferably, a banknote validator is provided to one side of the container and interior to the tower support. The validator receives banknotes through the slot 7 and can deposit the banknotes in the container 32 or its own stacker or container.

FIG. 4 also illustrates the extent that the touchscreen 12 is overlapped with the payment receiving module and FIG. 1 shows the very thin strip 5 which is part of the payment receiving portion provided to the one side of the touchscreen 12. This arrangement allows effective overlap of the touchscreen 12 with the tower support and allows a significant portion of the touchscreen to be cantilevered to one side of the tower. The cantilevered touchscreen as shown in FIG. 1 provides a modern and clean design. The tower support 8 includes a first tower upright 52 and a second tower upright 54 which are connected at the front face by the touchscreen support 10 and along the top edge as previously described. The touchscreen support 10 includes a plate having a port 11 provided therein which is defined by cutting and bending outwardly the flange 13. The flange 13 has also been punched to provide the speaker port 16 as shown in FIG. 5. The flange 13 also includes an upturned edge at the left side thereof which is connected to the second tower upright 54. The flange 13 with its connection to the second tower support 54 acts as a gusset or brace to rainforce the touchscreen support 10 against rearward movement.

Figure 7:
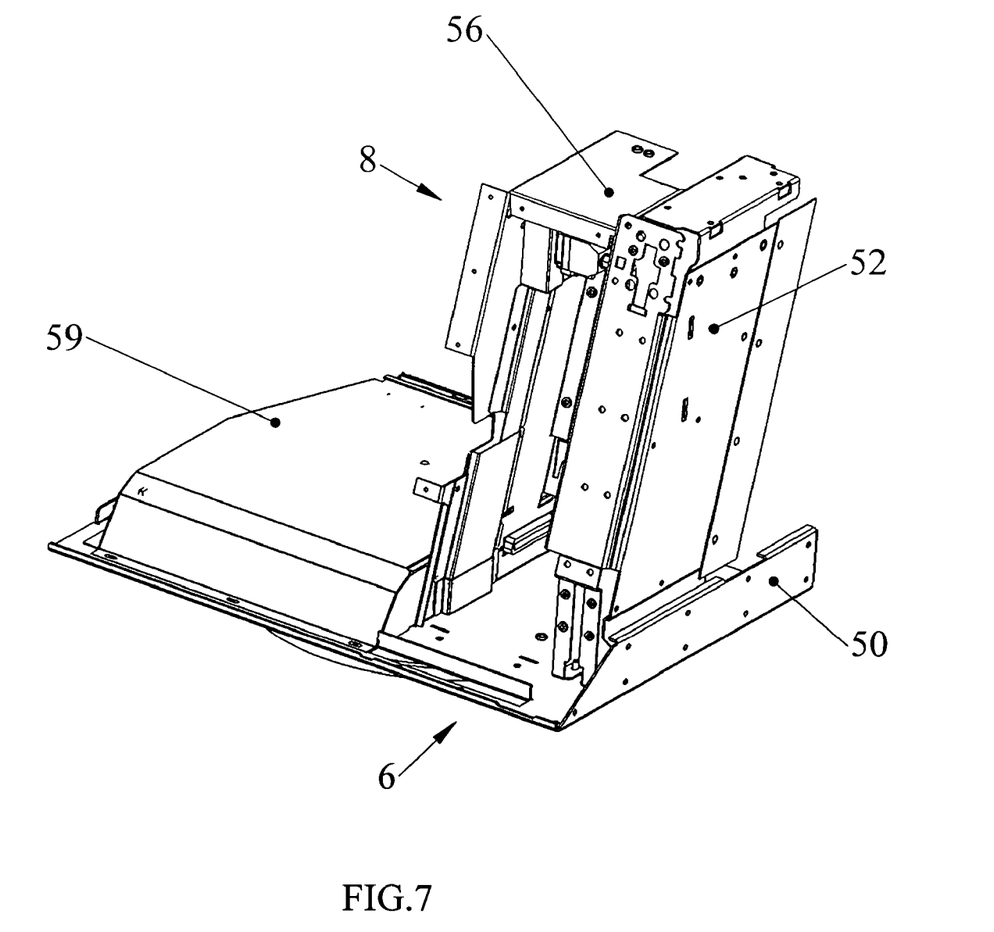
FIG. 7 is a front perspective view of part of the structural framework with the touchscreen support frame removed.
Figure 8:
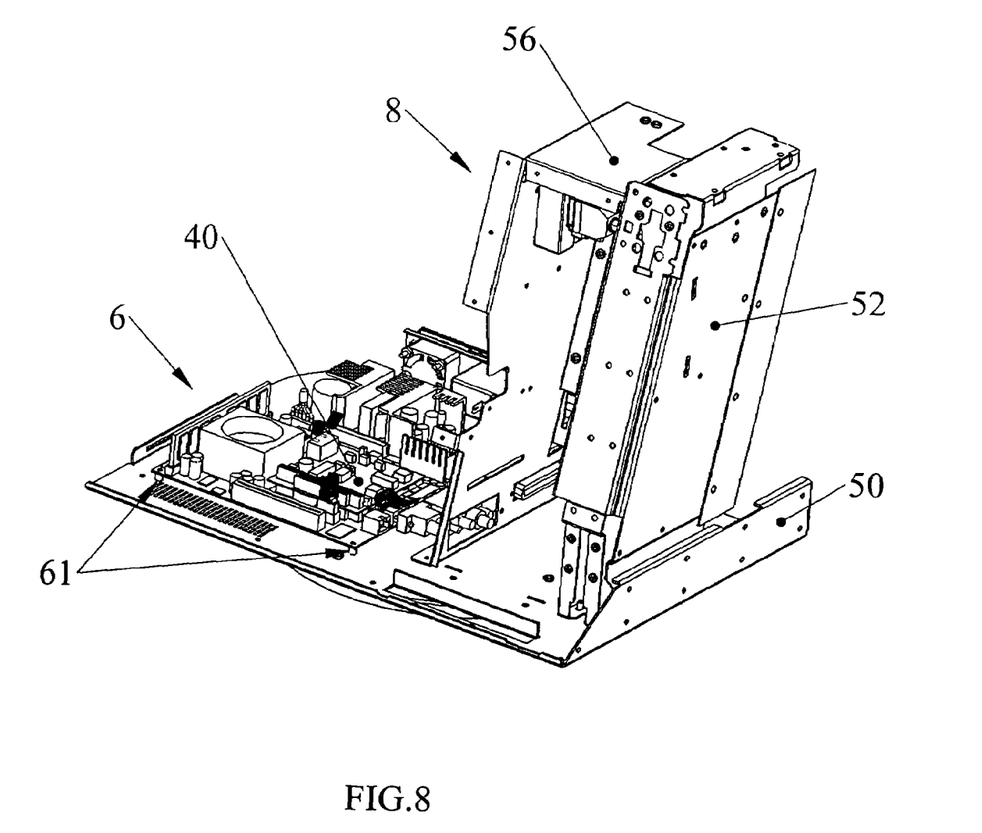
FIG. 8 is a front perspective view of the structural frame with the touchscreen frame removed and illustrating components of the computer control module.
Figure 9:
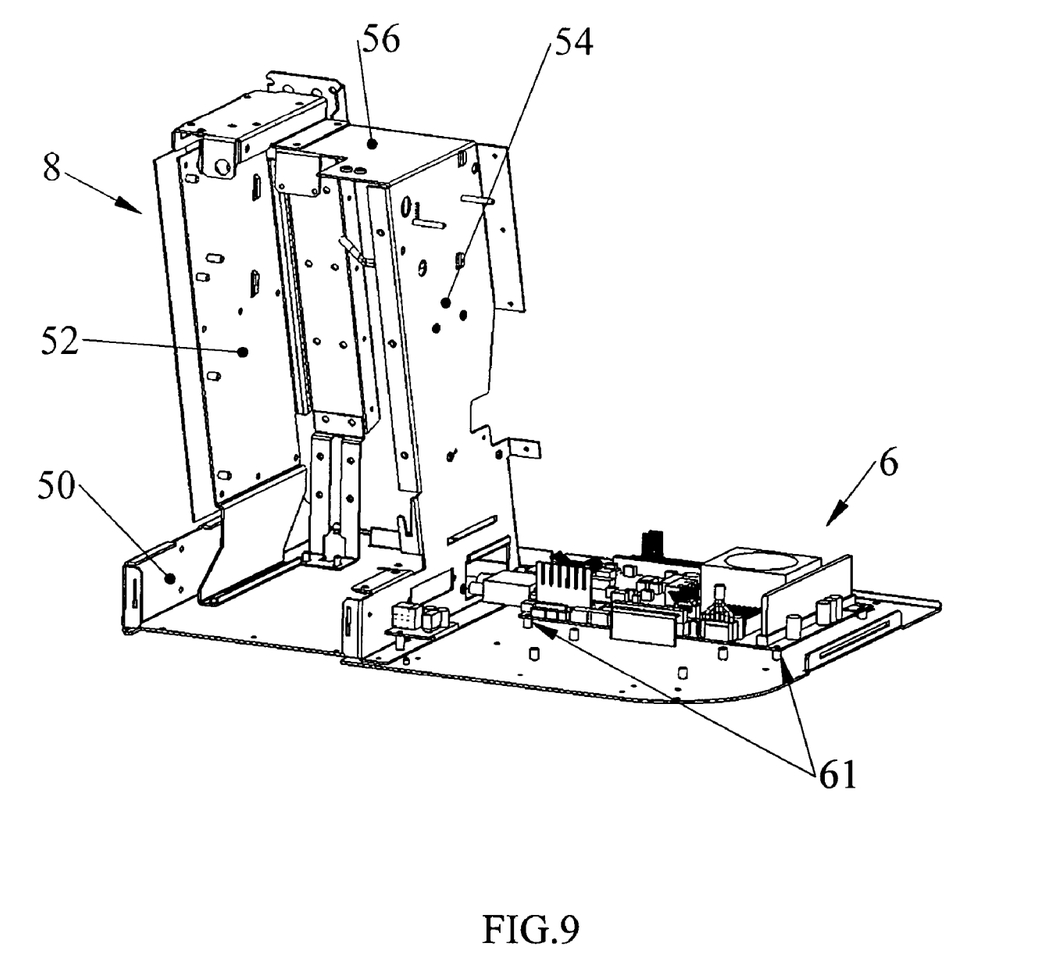
FIG. 9 is a rear perspective view of the structural frame with the various modules removed.
Figure 10:
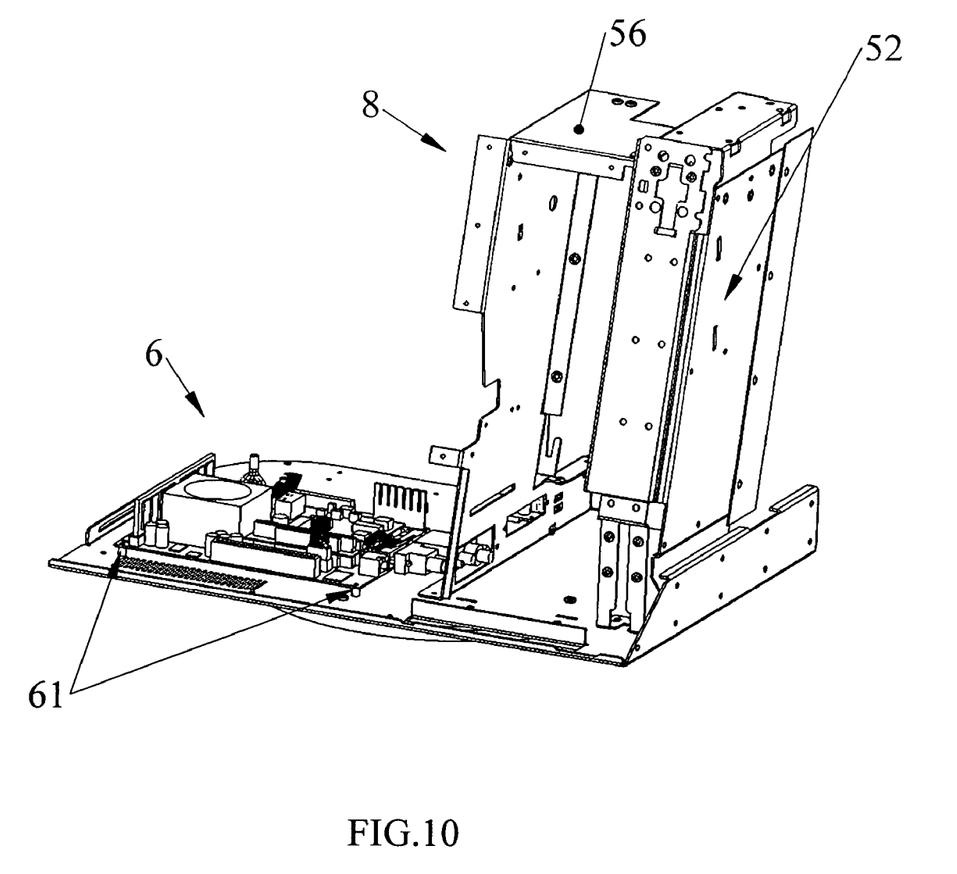
FIG. 10 is a front perspective view of the structural frame with the various modules removed and the touchscreen support frame removed.

FIG. 7 shows the cover 59 provided over the computer control module 40. The computer control module 40 is shown in FIG. 8 and is directly mounted on pin supports 61. In this way the circuit board is supported at a raised position above the base 6.

The countertop video terminal having a particular structural framework not only provides an elegant design but provides a robust terminal which can operate in demanding environments such as bars, restaurants or amusement arcades. The structural framework is easily fabricated and the effective overlap of the various modules and the horizontal orientation of the computer control module has a greatly simplified the design configuration. The modular design still allows effective service should any of the modules require service or replacement.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A countertop video game terminal comprising a payment receiving module, a computer control module, a touchscreen input/output module, and a support structure for integrating said modules; said support structure comprising a base having a front edge, a first side edge and an opposed, second side edge, and rear edge, a tower support to one side of said base and extending rearwardly from said front edge with said computer control module horizontally orientated on said base intermediate said tower support and said second side edge, said tower support having a hollow cavity therein that receives a cash type payment container;

said tower support further including a raised structural support extending towards said second aide and beyond said tower support that receives and supports said touchscreen input/output module in a cantilevered manner to one side of the tower with said touchscreen input/output module overlapping with said tower support and wherein said computer control module is provided on said base and is located below and spaced from a bottom edge of said touchscreen input/output module; and wherein said computer control module generally extends between said front and rear edges.

2. A countertop video terminal as claimed in claim 1 wherein said structural support is supported in a cantilevered manner from said tower support.

3. A countertop video terminal as claimed in claim 2 wherein said touchscreen input/output module is vertically spaced from said computer control module at said front edge a distance of at least one inch.

4. A countertop video terminal as claimed in claim 3 wherein said touchscreen input/output module includes a downwardly directed audio output positioned above and spaced from said computer control module and rearwardly of said front edge.

5. A countertop video terminal as claimed in claim 4 wherein said audio output directs an output signal into a gap between said computer control module and said audio output and towards said front edge.

6. A countertop video terminal as claimed in claim 5 wherein said audio output is a speaker.

7. A countertop video terminal as claimed in claim 1 wherein said computer control module has a height less than 50% of an average depth or length of said computer control module.

8. A countertop video terminal as claimed in claim 1 wherein said computer control module has a height dimension of less than 5 inches.

9. A countertop video terminal as claimed in claim 1 wherein each module is elongate and said payment receiving module extends vertically and rearwardly between said front edge and said rear edge and said touchscreen input/output module extends at raised position adjacent said front edge and between said side edges.

* * * * *